United States Patent [19]

Reggers

[11] 4,060,922
[45] Dec. 6, 1977

[54] ANIMAL IDENTIFICATION TAG

[75] Inventor: Charles Gerardus Reggers, Palmerston North, New Zealand

[73] Assignee: Delta Plastics Limited, Palmerston North, New Zealand

[21] Appl. No.: 666,059

[22] Filed: Mar. 11, 1976

[30] Foreign Application Priority Data

Mar. 12, 1975 New Zealand .................. 176913

[51] Int. Cl.² .............................................. G09F 3/00
[52] U.S. Cl. .................................................. 40/302
[58] Field of Search ................................ 40/300–304

[56] References Cited

U.S. PATENT DOCUMENTS 3,731,414 5/1973 Murphy et al. ................... 40/301

FOREIGN PATENT DOCUMENTS 251,292 6/1963 Australia .......................... 40/301

Primary Examiner—Edgar S. Burr
Assistant Examiner—A. Heinz

[57] ABSTRACT

An identification tag for an animal which consists of a first member having a panel and projecting headed spike and a second member which has a hole of a smaller cross-sectional size that the largest cross-sectional size of the headed spike. The second member can be a flap attached to the first member. The tag is formed by passing the headed spike through a part of the ear of an animal so the panel is retained in a generally upstanding position on the ear.

9 Claims, 6 Drawing Figures

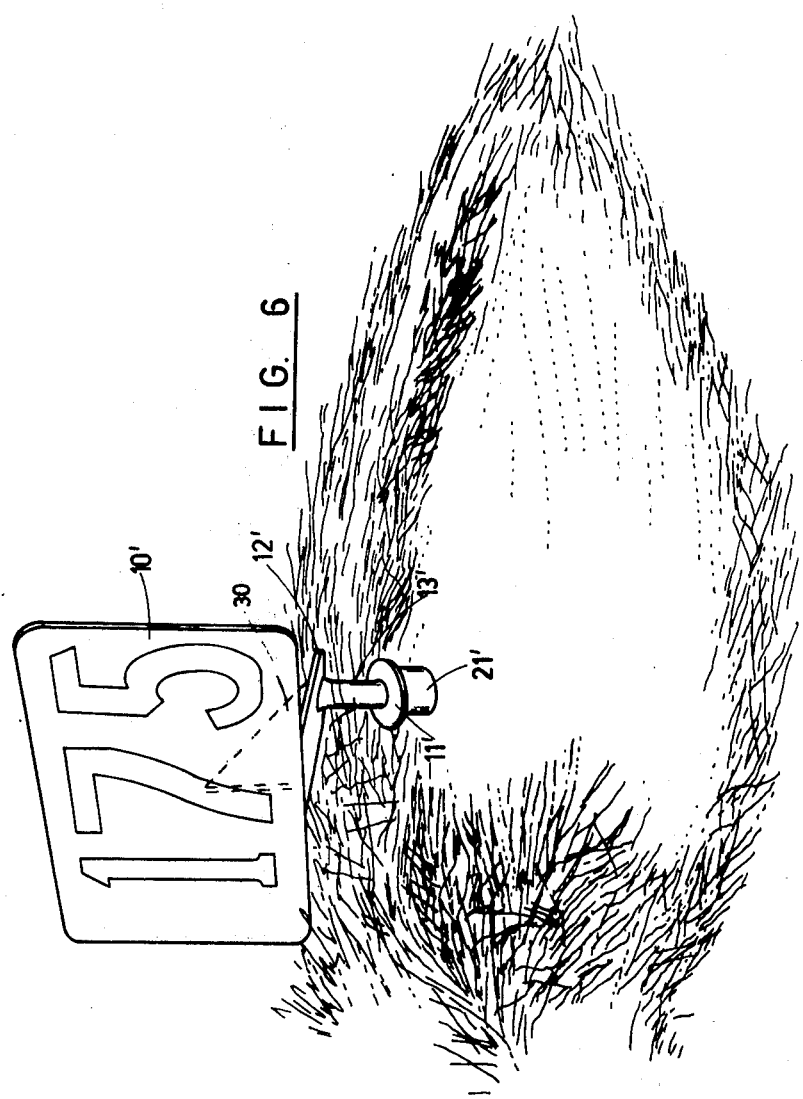

ANIMAL IDENTIFICATION TAG

BACKGROUND OF THE INVENTION

This invention relates to an improved tag designed for attachment to a part of an animal for identification purposes.

To assist in the identification of animals it is well known to apply a tag to some part of the animal, usually the ear, the tag bearing suitable information to allow for quick and easy identification. The tag can consist of two tabs (such as described in U.S. Pat. No. 3,731,414) with one tab having a male member which is passed through the ear of an animal to engage in a female form in the other tab. The two tabs are locked together by the male member fitting in the female form to provide the complete tag. In use the tag is contained within the area of the ear or hangs downwardly therefrom depending on the physical dimensions of both tabs. The tags according to the aforesaid patent specification have proved to be a very effective means of animal identification.

Other types of tags are also known and whilst having differing degrees of effectiveness nearly all include single or double tabs which are contained within the area of the ear or hang therefrom.

In some applications it has become apparent that a tag which stands upwardly from the ear of an animal would be much more effective for ready identification. A tag of this type has heretofore not been successfully developed because of the difficulty in maintaining a tag in the upright position especially when the tab or tabs forming the tag are of a resilient nature. Some attempts have been made to construct such an upstanding tag but all resulted in complex tags which are very difficult to apply or which require specially constructed applicators.

I have now devised a tag which will stand upright from an animal's ear and which is easy to apply from a known type of applicator.

SUMMARY OF THE INVENTION

Broadly in a first aspect the invention consists of an identification tag for an animal comprising a resilient tab member having an upstanding headed spike and spaced apart therefrom a hole of smaller cross-sectional size than the largest cross-sectional size of the spike, either of said spike or hole being part of a flap formed from the parent material of the tab member and able to be bent out of the plane of the tab member to permit the head of the spike to pass through the said hole.

Broadly in a second aspect the invention consists of an identification tag for an animal comprising a first member which includes a panel and a projecting headed spike; a second member including a hole of smaller cross-section size than the largest cross-sectional size of the headed spike, said tag being formed by passing the headed spike through a part of the ear of an animal and the said hole so that the panel is retained in a generally upstanding position in relation to the part of the ear through which the headed spike has passed.

BRIEF DESCRIPTION OF THE DRAWINGS

FIG. 5 is a cross-sectional view of the spike and FIG. 6 is a view similar to FIG. 3 but of a second form of the invention.

DETAILED DESCRIPTION OF CERTAIN PREFERRED FORMS OF THE INVENTION

Figure 2:
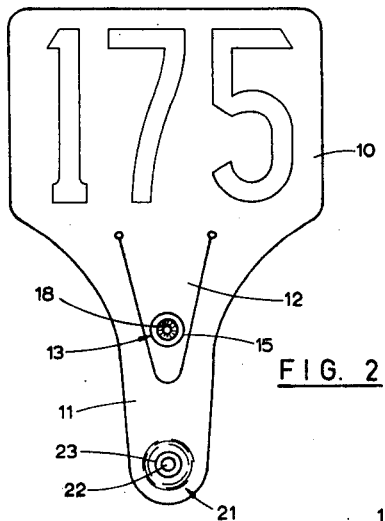
FIG. 2 is a plan view of the tag.
Figure 5:
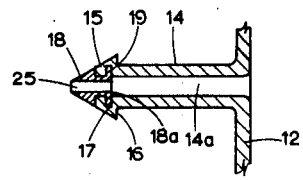
Figure 1:
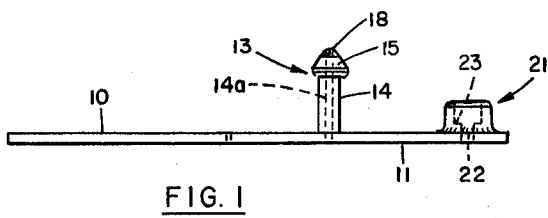
FIG. 1 is a side view of the tag.

In its preferred from the tab is constructed from a resilient elastomeric plastics material such as polyurethane. As shown in the drawings the tab comprises a flat thin panel 10, on which information can be placed, of substantially rectangular configuration with a narrower panel 11 extending from one long side thereof. This, is as stated, only one preferred form and other configurations of thin flexible material can be employed.

A flap 12 is cut in the area of the tab and extends from the or adjacent the panel 10 into the narrower panel 11 and is substantially centrally disposed in the narrower panel 11. The spike 13 is positioned on the central longitudinal axis of the flap 12 and toward the free end thereof. The spike 13 is formed with a hollow stem 14 which is moulded integral with the flap 12 and is of tubular formation with a bore 14a of constant diameter extending through it.

The outer end of this hollow stem 14 is of an enlarged nature providing a flanged end 15 having an inner shoulder 16 with the external surface of the rest of the stem 14 and an inside groove 17. The enlarged end 15 is moulded around a metal insert 18 which has a flange 19 fitting into the groove 17 for the insert 18 to become an integral part. The inner shoulders 18a of the insert 18 engage with a shoulder on the pin of an applicator and the insert 18 thus pulls the stem 14 and its flanged end through the animals ear as well as the hole 22 in the boss 21.

The outer end of the narrower panel 11 is formed with a boss 21 through which a hole 22 is formed. This hole 22 includes a seat 23 of a size larger than the cross-sectional area of the rest of the hole. The hole 22 and its seat 23 extend on a axis perpendicular to the plane of the panel 11.

The metal insert 18 is so designed that it and the flange end 15 are encased in the boss 21 when installed in an animal's ear. The metal insert 18 is generally of conical formation with its bore 25, which extends straight through the insert, providing an outer cutting edge. Alternatively the insert 18 may be formed with a sharpened point and the bore 25 only extending part way through the insert. In this form the pin of an applicator does not extend through the insert 18.

Figure 3:
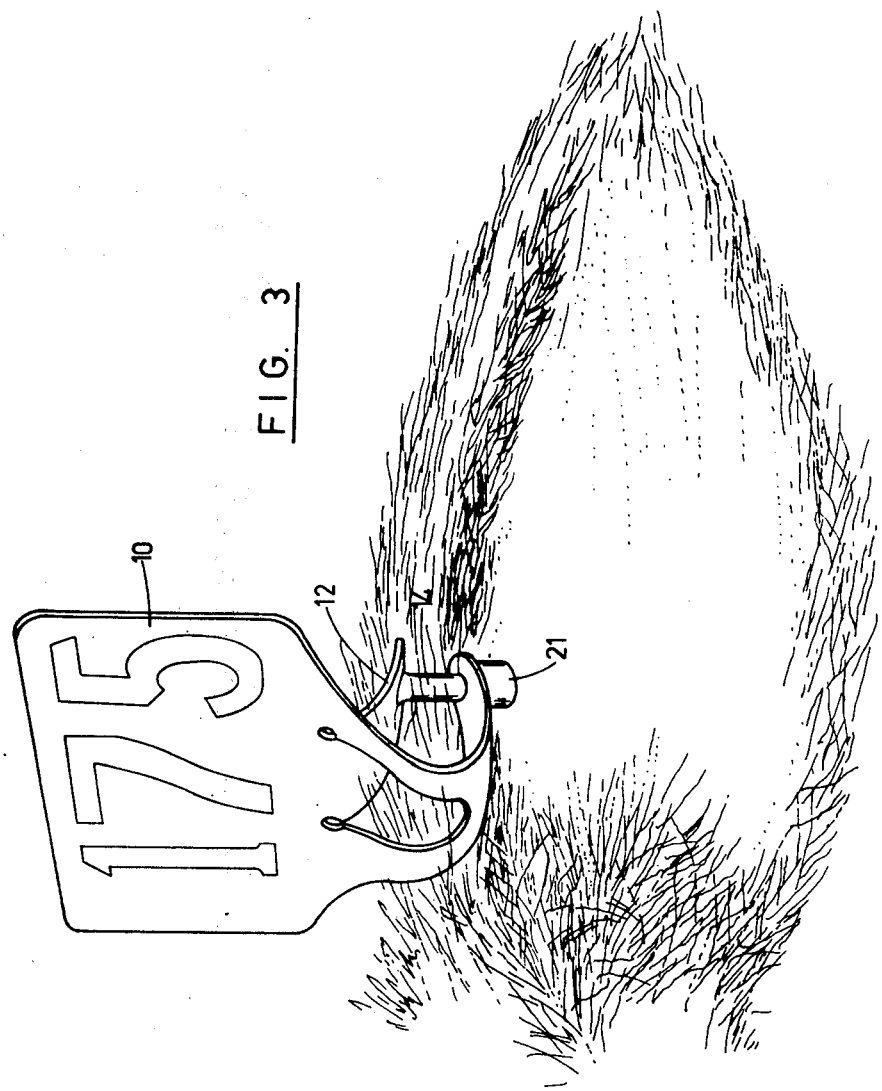
FIG. 3 is a view of the tag as applied to the ear of an animal.
Figure 4:
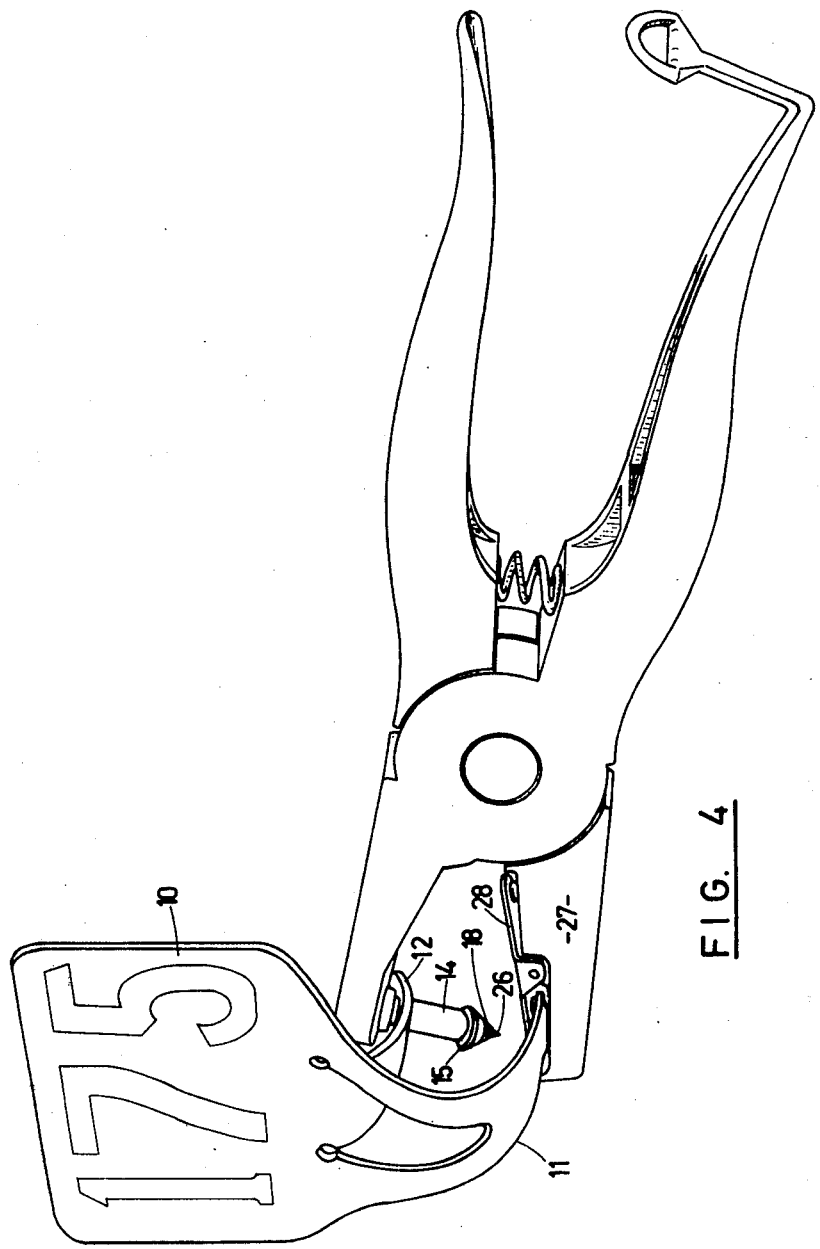
FIG. 4 is a view of the tag and an applicator prior to application of the tag to the ear of an animal.

The tag is applied to the upper part of the ear of an animal as shown in FIG. 3 by an applicator of the type shown in FIG. 4. The applicator is of the type described and claimed in U.S. Pat. Spec. No. 3,812,859 and the construction and operation of the applicator is described in the said specification.

Referring to FIG. 4 the flap 12 is bent out of the plane of the tab and the spike 13 is mounted on the fixed pin as shown with the pointed end 26 projecting beyond the insert 18. The narrower panel 11 is also bent out of the normal plane of the tab and the boss 21 is positioned in the open-slot (not shown) in the jaw 27 and retained therein by spring biased member 28. The applicator is operated as described in the patent specification referred to above to apply the tag to the animal's ear.

Referring to FIG. 3 it will be seen how the identification panel 10 stands upright from the top of the ear. The boss 21 end of the narrow panel 11 resides underneath the top part of the ear with the panel 11 itself curving around the thick leading top part of the ear. The combined action of the panel 11 curving around the ear and the steadying effect of flap 12 on top of the ear ensures that the tag always remains in the upright position. When applied correctly the narrow panel 11 and flap 12 closely follow the contours of the ear surface to prevent the tag being snagged on fixed objects such as fence lines etc and any snagging of the projecting parts of the tag is overcome by the resilient nature of the material from which the tag is formed.

The tag is quick and easy to apply and is able to be viewed very easily even when the animal has its head lowered.

Referring to FIG. 6 a second form of the tag is shown. In this form the spike 13' is formed with a small flap 12' extending out from the panel 10'. This spike 13' is of the same form of previously described. The boss 21' and associated hole (not shown) is provided on a member 11' which is separate from the panel 10'. The spike 13' is placed on the applicator in the same manner as the first embodiment and the member 11' is clamped to the applicator by spring biased member 28. The tag is then applied to the animal's ear whereupon the panel 10' remains in a generally upstanding relationship with the animal's ear. To add stiffness to the panel 10' as small web 20 between the panel and flap 12' is provided. In addition the upper surface of member 11' is contoured, such as being say eliptical in plan and convex in elevation, to conform to the contours of the inner part of the animals ear.

What is claimed is:

1. A one piece resilient material identification tag for an animal comprising:
   a flat identification panel;
   a first attachment portion in the form of a panel narrower than said identification panel and extending therefrom;
   a second attachment portion in the form of a flap centrally disposed in said first attachment portion panel and extending away from said identification panel, said first and second attachment portions being substantially coplanar with said identification panel; and
   an upstanding headed spike and spaced apart from the spike a hole of smaller cross-sectional size than the largest cross-sectional size of the spike, said spike and hole being respectively part of said second and first attachment portions and positioned at different distances from the identification portion whereby the said first and second portions can be displaced from the plane of the identification portion so that the tag can be installed on the top of the ear of an animal, with the identification part in a vertical attitude, by passing the head of the spike through the ear and into said hole.

2. A tag as claimed in claim 1 wherein the spike consists of a hollow stem with a flanged outer end and a substantially conical shaped hard material tip fitted to the flanged end.

3. A tag as claimed in claim 2 wherein the stem has a bore of constant diameter extending through it and the outer end of the stem is enlarged to provide the flanged end with an inner shoulder extending from the external surface of the stem.

4. A tag as claimed in claim 3 wherein the enlarged end is moulded around the hard material tip to become an integral part thereof, said tip having a central bore concentric with the stem bore but of a smaller diameter such that a shoulder of hard material is provided in the bore of the stem.

5. A tag as claimed in claim 4 wherein the said central bore extends completely through the hard material tip.

6. A tag as claimed in claim 5 wherein a boss is formed about the hole and includes a seat, the flanged end of the spike being adapted to be supported upon the seat after installation of the tag.

7. A tag as claimed in claim 1 wherein the spike is positioned on the central longitudinal axis of the flap toward the free end thereof and the hole is adjacent the free end of said narrower panel.

8. A tag as claimed in claim 7 which is formed of a resilient elastomeric plastics material.

9. A tag as claimed in claim 8 wherein said plastics material is polyurethane.

* * * * *